US008795537B2

(12) United States Patent
Van der Merwe et al.

(10) Patent No.: US 8,795,537 B2
(45) Date of Patent: Aug. 5, 2014

(54) SETTLER WITH OVERFLOW RECYCLE

(75) Inventors: Shawn Van der Merwe, Calgary (CA); Thomas C. Hann, Onaway (CA)

(73) Assignee: Fort Hills Energy L.P., Calgary AB (CA)

( * ) Notice: Subject to any disclaimer, the term of this patent is extended or adjusted under 35 U.S.C. 154(b) by 351 days.

(21) Appl. No.: 13/232,874

(22) Filed: Sep. 14, 2011

(65) Prior Publication Data
US 2012/0061334 A1 Mar. 15, 2012

(30) Foreign Application Priority Data

Sep. 14, 2010 (CA) ..................................... 2714735

(51) Int. Cl.
*B01D 17/025* (2006.01)
*B01D 21/02* (2006.01)
*B01D 17/02* (2006.01)
*B01D 21/00* (2006.01)
*B01D 21/24* (2006.01)
*B01D 21/34* (2006.01)
*B03D 1/08* (2006.01)

(52) U.S. Cl.
CPC ........ *B01D 17/0214* (2013.01); *B01D 21/0006* (2013.01); *B01D 21/2433* (2013.01); *B01D 21/2488* (2013.01); *B01D 21/34* (2013.01); *B01D 2221/04* (2013.01); *B03D 1/082* (2013.01); *B03D 2203/006* (2013.01)
USPC ........... 210/800; 210/805; 210/194; 210/523; 210/540; 210/541

(58) Field of Classification Search
USPC .............. 210/800, 804, 805, 194, 195.1, 196, 210/513, 523, 532.1, 540, 541, 542
See application file for complete search history.

(56) References Cited

U.S. PATENT DOCUMENTS

| | | | | |
|---|---|---|---|---|
| 2,579,304 A | | 12/1951 | Crawford | |
| 2,713,026 A | * | 7/1955 | Kelly et al. | 210/194 |
| 3,113,100 A | * | 12/1963 | Moore | 210/196 |
| 3,219,189 A | * | 11/1965 | Moore | 210/540 |
| 3,224,964 A | * | 12/1965 | Gunther et al. | 210/540 |
| 5,089,118 A | * | 2/1992 | Mahoney | 210/523 |
| 5,942,128 A | * | 8/1999 | Fortier | 210/800 |
| 6,146,530 A | * | 11/2000 | Vollmer | 210/532.1 |
| 7,122,118 B2 | * | 10/2006 | Walker | 210/194 |
| 7,988,865 B2 | * | 8/2011 | Laros et al. | 210/194 |
| 8,123,955 B2 | * | 2/2012 | Lake et al. | 210/194 |
| 2010/0012555 A1 | | 1/2010 | Moran et al. | |

OTHER PUBLICATIONS

Office Action dated Dec. 21, 2012 issued to Canadian Patent Application No. 2,714,735.

* cited by examiner

*Primary Examiner* — Christopher Upton
(74) *Attorney, Agent, or Firm* — Knobbe, Martens, Olson & Bear, LLP

(57) ABSTRACT

A method for controlling fouling of a settler vessel overflow system comprises maintaining at least a minimum stream flow in the overflow system by recirculating a portion of the overflow stream. A system for performing the method is also disclosed.

22 Claims, 6 Drawing Sheets

SETTLER WITH OVERFLOW RECYCLE

FIELD OF THE INVENTION

This invention relates generally to methods and equipment for mitigating fouling of the overflow system of settler vessels.

BACKGROUND OF THE INVENTION

Conventional settler design typically collects product overflow in an overflow system, such as a launder about the perimeter of the settler vessel, for transfer to the next unit operation. In the event the next unit operation is a pump, either a pump box or capacity in the overflow system provides surge capacity for the pump to accommodate and control flow variations. In some cases, flow variations in the overflow system are not important. However, in some bitumen froth treatment methods, the overflow stream contains components which may precipitate with minor temperature or concentration variations. For example, if alkane (paraffinic) solvents are used to treat the bitumen stream, the overflow stream will be a solution containing asphaltenes which are susceptible to precipitation with changes in temperature or concentration. While the overflow stream solution may be stable at high flows, at low flows stream temperatures may cool resulting in asphaltenes depositing and fouling the overflow system. This also holds for systems with trace components that may cause fouling at low flows.

To address this problem, conventional settlers may be periodically removed from operation to clean the overflow system which is often a launder. The cleaning operation involves personnel and equipment entering the settler vessel after solvent vapours are reduced to a safe level. As the solvent commonly complexes in asphaltene deposits, bringing solvent vapour levels down to a safe level involves repeated flushings and purgings with the on-going risk that removing asphaltene deposits cause high solvent vapour levels.

An alternative approach involves stabilizing the overflow stream composition. The overflow composition from the settler is at the solubility limit of asphaltenes in diluted bitumen. Using solubility equilibrium data to either add maltenes and/or adjust overflow temperatures, the overflow stream composition can be stabilized by shifting the composition away from the solubility limit. While the solubility response of asphaltenes is relatively well known, Imperial Oil has recently filed a Canadian Patent application no. 2,669,380 to recycle bitumen product to stabilize diluted bitumen streams.

SUMMARY OF THE INVENTION

To address the foregoing issues with overflow system fouling, applicant has developed an alternative solution to the problem. Applicant's approach is based on maintaining an adequate flow within the overflow system to scour away fouling material by shear forces, and/or to suspend fouling material within the overflow stream, and to reduce residence time within the system, thereby controlling fouling with the system.

Accordingly, the present invention provides a method for controlling fouling of a settler vessel overflow system comprising maintaining at least a minimum stream flow in the overflow system by recirculating a portion of the overflow stream.

In another aspect, there is provided a system for controlling fouling of a settler vessel overflow system comprising:

means for recirculating a portion of an overflow stream from the overflow system; and control means for maintaining at least a minimum stream flow in the overflow system by recirculating the portion of the overflow stream.

In the particular case of a settler handling a bitumen feed stream treated with alkane (paraffinic) solvents in which the overflow stream will be a solution containing asphaltenes, the overflow recycle scheme of the present invention provides a simple, reliable and elegant solution to the problem of system fouling by maintaining an adequate flow in the overflow system to minimize asphaltene deposition and suspend precipitating asphaltene particulates, thereby reducing downtime for overflow system cleaning. From another point of view, the method and system of the present invention function to increase the flow within the overflow system, thereby reducing the residence time of potential fouling material within the system.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
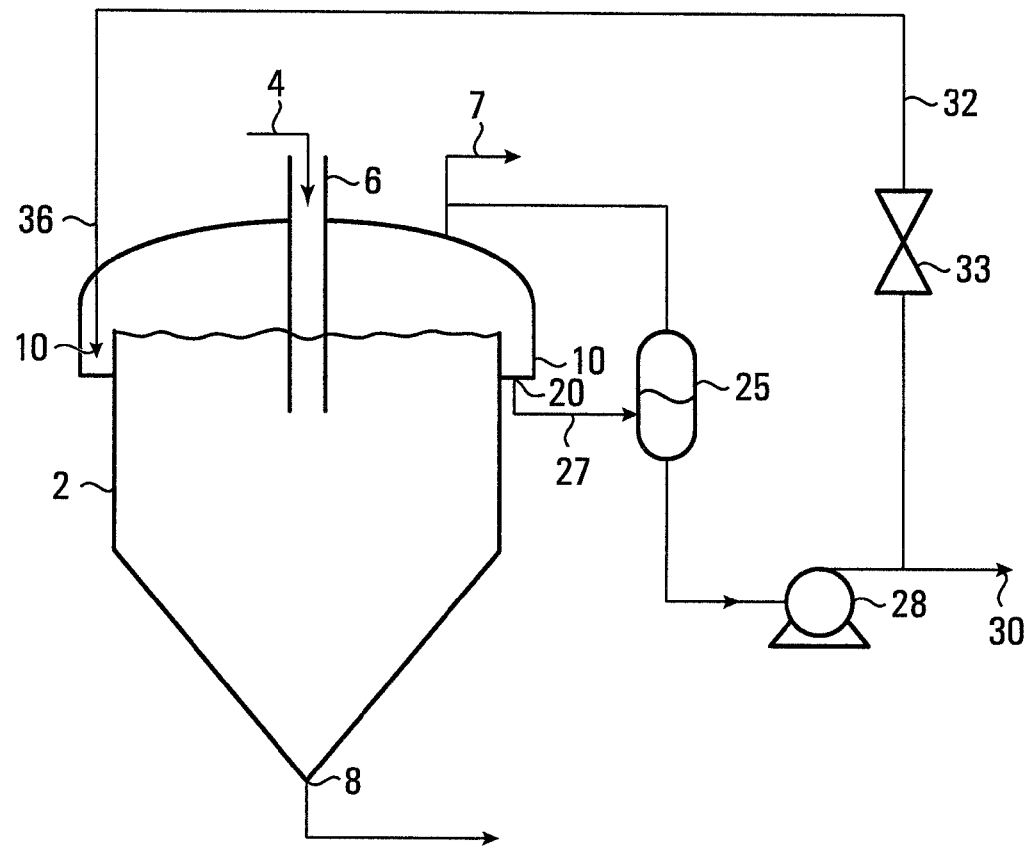
FIG. 1 is a schematic view of a settler incorporating the overflow stream recycle process of the present invention according to an embodiment that recycles to the launder of the settler.

Referring to FIG. 1, there is shown schematically the apparatus of the present invention according to a first embodiment. Settler vessel 2 receives a bitumen froth feed stream 4 via inlet 6. In the interior of the vessel, conditions are established for settling of the bitumen forth stream to occur into a heavier component phase which settles downwardly to underflow outlet 8, and a lighter phase which rises and overflows into launder 10 to be collected as the product overflow stream for further processing. The launder 10 and the associated conduit system that transports the overflow stream comprise the overflow system of the settler. Vapours released either from the bitumen froth feed or vaporization of lighter phase material are collected by a venting system 7 in the form of a venting conduit. The venting conduit is also used to regulate the pressure in the settler vessel.

Figure 2:
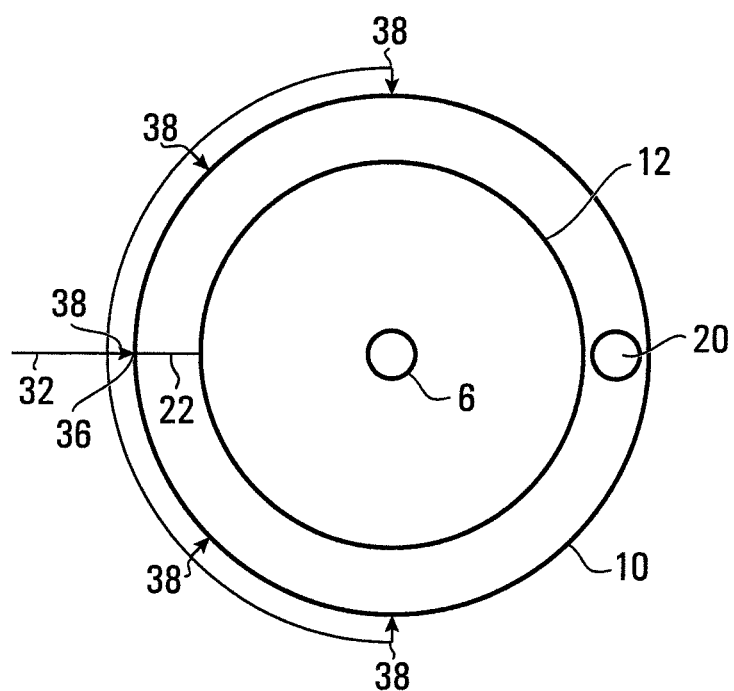
FIG. 2 is a plan view of the embodiment of FIG. 1.

In the illustrated settler, the launder 10 is a generally annular channel about the outside perimeter of the vessel, and FIG. 2 provides a plan view of the vessel surrounded by the launder channel. Other arrangements of the launder are possible, and a skilled person will understand that changing the configuration or geometry of the launder may also assist in reducing fouling. By way of example, the launder channel may be positioned about the inner perimeter of the vessel. In either arrangement, the product stream overflows a weir edge 12 into the launder channel. The launder usually has a single outlet 20 at a low point in the launder and, opposite the outlet, a high point 22 such that any overflow that enters the launder travels by gravity toward the outlet.

Returning to FIG. 1, the product overflow stream that exits outlet 20 of the launder flows to a reservoir 25 via conduit 27. Reservoir 25 in turn communicates with pumping means, preferably in the form of a pump 28 which transfers the majority of the overflow stream to the next process unit operation generally indicated by reference number 30. Reservoir 25 may comprise the pump box for pump 28, and at least the minimum pump flow may be returned to the launder in lieu of the pump box. Reservoir 25 also communicates with the venting system. A control system operates pump 28 and valve 33 to maintain at least a minimum flow at all times in the overflow system including the launder of the present embodiment. The control system operates to control the volume of the recirculated portion of the overflow stream so that at least a minimum flow in the launder is maintained adequate to perform the scouring and suspension functions necessary to reduce fouling of the overflow system. Preferably, a substantially constant flow is maintained in the overflow system in all operating cases.

In the embodiment of FIG. 1, means for recirculating a portion of the overflow stream from the overflow system are provided in the form of conduit 32 which delivers the recirculated portion to launder 10. Conduit 32 delivers the recirculated stream to the launder via at least one inlet. As shown in FIG. 2, the inlet may comprise a single inlet 36 at the high point 22 of the launder. Alternatively, an injection system having a plurality of inlets 38 about a perimeter of the launder may be employed.

Figure 3:
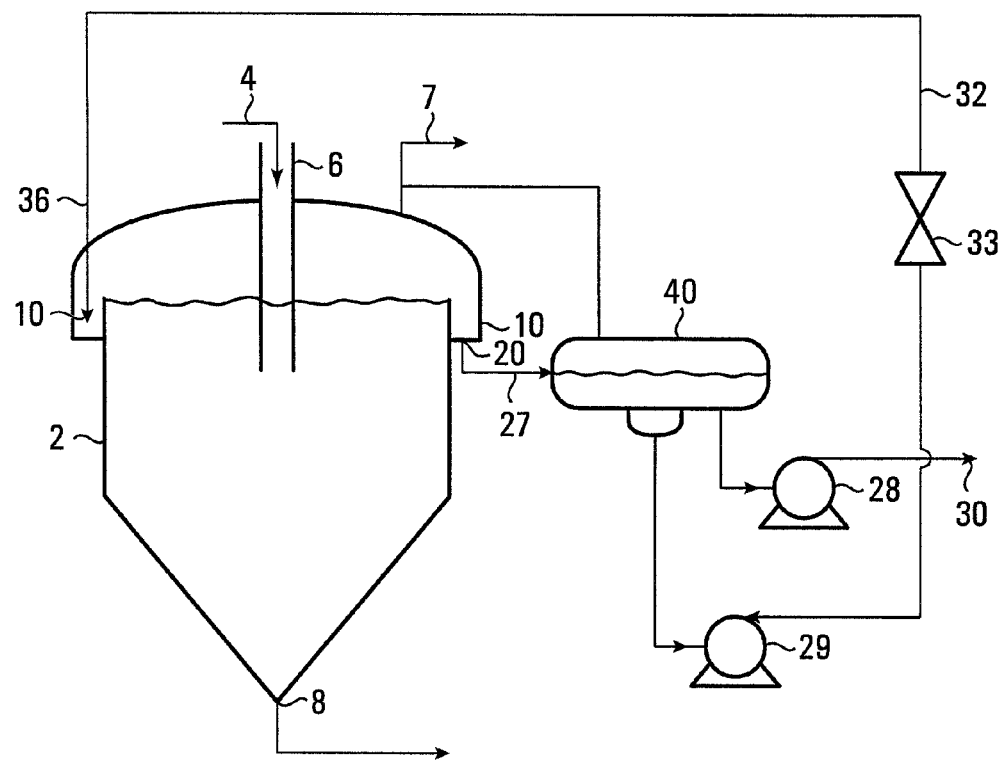
FIG. 3 is a schematic view of an embodiment that recycles a separated portion of the overflow steam.
Figure 4:
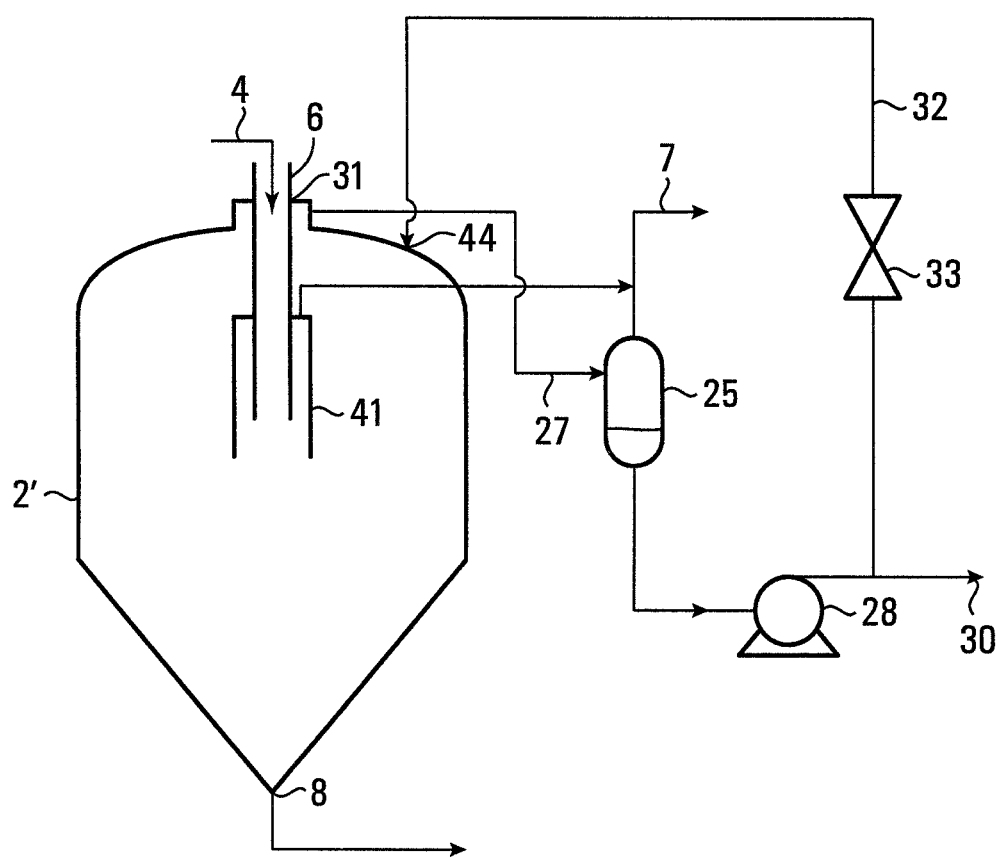
FIG. 4 is a schematic view of an embodiment that recycles the portion of the overflow stream to the settler vessel.
Figure 5:
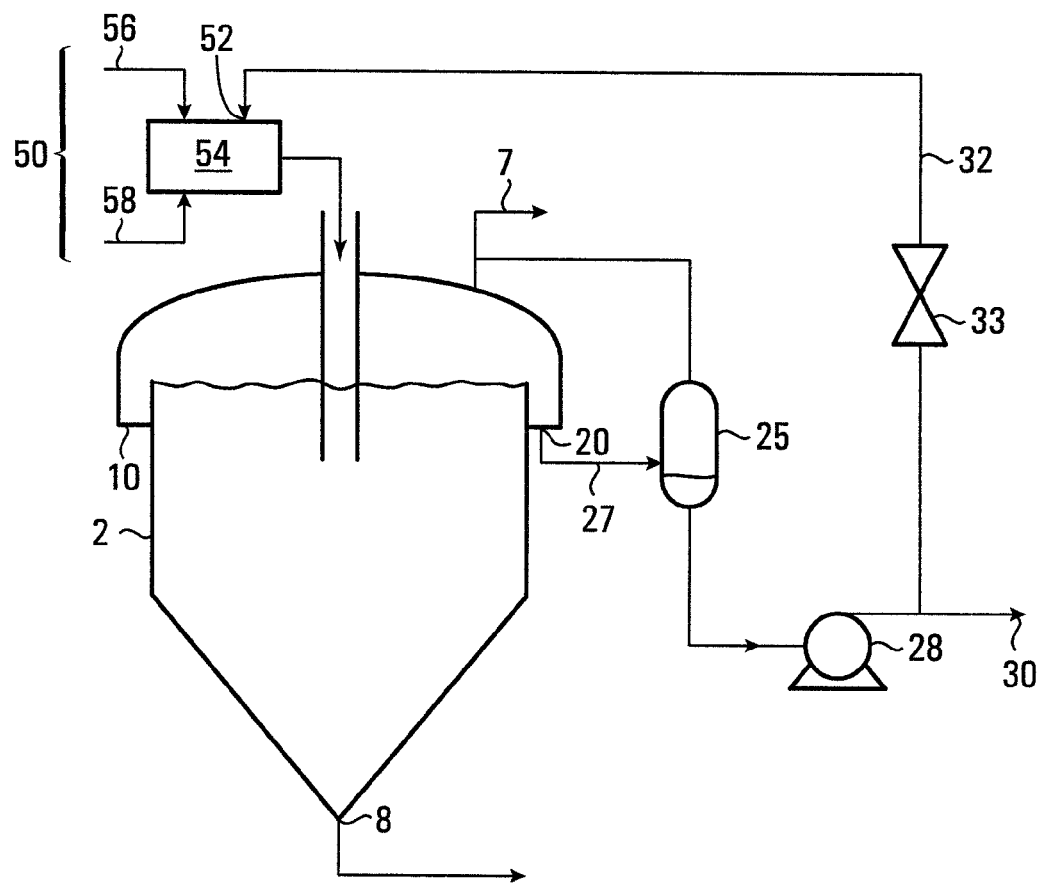
FIG. 5 is a schematic view of an embodiment that recycles the portion of the overflow stream to the feed being introduced to the settler.

The embodiment of FIGS. 1 and 2 functions by delivering the recirculated portion of the overflow stream back to the launder of the overflow system. Other embodiments of the system are possible based on the composition of the recirculated portion of the overflow stream and on the point at which the recirculated stream is reintroduced into the system. For example, FIGS. 3 to 5 illustrate exemplary alternative embodiments. In FIGS. 3 to 5, features identical to the embodiment of FIGS. 1 and 2 use the same reference number.

FIG. 3 shows schematically an arrangement in which the overflow stream is fed to a separator 40 that separates an immiscible phase that is recycled back by a pump 29 to maintain at least a minimum flow in launder 10. Separator 40 is a three way liquid/liquid/gas separator in the illustrated embodiment. By varying the speed of pumps 28 and 29 or the setting of valve 33, the overflow recycle stream and overflow product stream 30 are controlled at a specific total flow rate. As the immiscible phase can separate in the vessel 2, this embodiment will function with a launder equipped separation vessel. The specifications of separator 40 are based on liquid/liquid/gas separators such as detailed in "Successfully Specify Three-Phase Separators" by W. Monnery and W. Svreck, Chemical Engineering Progress, September 1994.

FIG. 4 shows an alternative embodiment that recirculates a portion of the overflow stream to a settler 2' that does not include a launder. In this arrangement, the overflow stream is recirculated directly to the settler vessel. Preferably, the recirculated flow is delivered to an inlet 44 near the overflow outlet 31 of the settler. The inlet 44 flow is designed to minimize impact on the separation function of the settler while allowing for establishment of an adequate velocity profile within the conduits and equipment of the overflow system to reduce fouling. The embodiment of FIG. 4 preferably makes use of an internal venting pipe 41 about inlet feed 6 and in communication with venting system 7 to capture vapour released from the feed.

FIG. 5 shows a still further embodiment that recirculates a portion of the overflow stream to the feed system of the settler. In FIG. 5, the recirculated portion of the overflow stream is delivered to the feed system 50 of the settler at 52 in order to maintain at least a minimum flow throughout all sections of the vessel that are subject to flow variations due to feed availability or feed composition variation. By maintaining at a least a minimum flow throughout the overflow system, increased shear rates and decreased residence times within the vessel assist in minimizing fouling. Insertion point 52 of the recirculated feed is preferably at a mixing means in the form of a mixer 54 which also receives a bitumen feed 56 and a solvent feed 58. Mixer 54 can be any mixer apparatus such as a tee mixer as disclosed in U.S. Pat. No. 4,035,282, a jet mixer, a static mixer, or an in-line mixer or combinations thereof. By introducing the recirculated overflow stream upstream of the settler, fouling of all downstream operations is minimized. While the mixer arrangement of FIG. 5 is shown in conjunction with a settler having a launder, such a configuration may also be used in conjunction with the non-launder settler of FIG. 4.

The schematic depictions of the various embodiments show the recirculated overflow stream being extracted downstream of a pump with no equipment in between. It will be understood that miscellaneous processing equipment such as heat exchangers may be located upstream of the recycle take-off point such that this equipment will enjoy the benefits of the flows through the system to minimize fouling.

Figure 6:
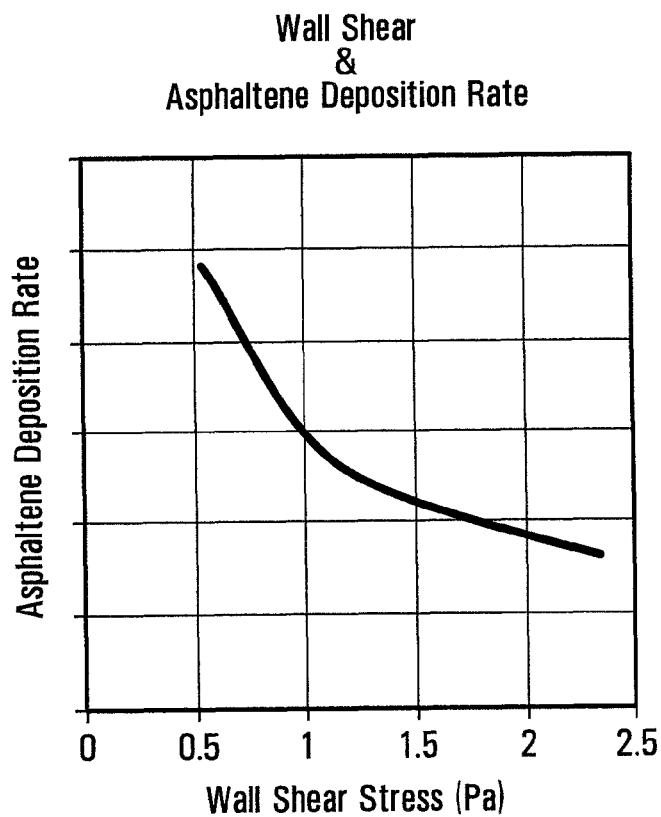
FIG. 6 is a graph showing the effect of wall shear stress on asphaltene deposition.
Figure 7:
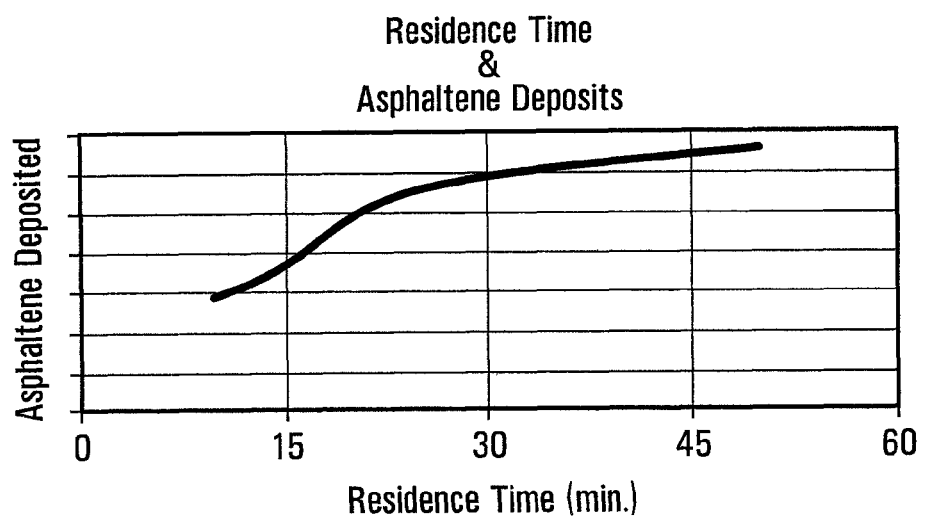
FIG. 7 is a graph showing the effect of residence time on asphaltene deposition.

The method and system of the present invention make use of maintaining at least a minimum overflow stream in the overflow system. Preferably, a relatively constant flow is maintained in the overflow system. In this manner, fouling of the overflow system by components of the stream that may come out of solution or by suspended phases is reduced as the overflow stream flow is designed to scour by shear forces and suspend contaminants. For example, in the case of paraffinic solvents being used to treat a bitumen stream, the overflow stream from the settler vessel will be a solution containing asphaltenes which are susceptible to precipitation and depositing in the flow conduits of the overflow system. FIG. 6 illustrates the effect of wall shear stress on the asphaltene depositions rate for a constant residence time. Higher velocities of the overflow stream in the overflow system equate to maintaining high shear rates at the walls of the flow conduits with a concomitant reduction in fouling. Similarly, FIG. 7 illustrates the effect of residence time on the asphaltene deposition rate. Lower residence time in the overflow system is equivalent to higher flow rates. In other words, the method and system of the present invention operate to eliminate lower flows in the system as lower flows lead to decreased shear at the conduit walls and increased residence time within the system which contribute to increased asphaltene deposits. The present method and system rely on the synergistic effect of higher stream flows and concomitant reduced residence times within the overflow system to reduce fouling of the overflow system.

With the method and system of the present invention, the maximum benefit is obtained by collecting the recirculated flow from as far downstream as possible as this will tend to protect the equipment and piping between the point of reintroduction and the point of collection by maintaining the velocity through the entire conduit and equipment system. In addition, the method and system described tends to minimize the residence time of the overflow stream within the launder, pipe and equipment to prevent the adhesion of the asphaltene to surfaces. Even if precipitation occurs, fouling does not necessarily happen if the flow through the system is sufficiently fast to prevent deposition. Therefore, the method and system of the present invention functions to reduce the likelihood of fouling, and, as such, increases the run-time and efficiency of an operation by minimizing capital (e.g. sparing and cleaning facilities).

Although the present invention has been described in some detail by way of example for purposes of clarity and understanding, it will be apparent that certain changes and modifications may be practised within the scope of the appended claims.

What is claimed is:

1. A method for controlling fouling of a settler vessel overflow system, the overflow system being operable to produce an overflow stream, the method comprising:
   recirculating a portion of the overflow stream back through the overflow system; and
   controlling a volume of the recirculated portion of the overflow stream to maintain at least a minimum stream flow in the overflow system, the minimum stream flow being adequate to reduce fouling of the overflow system.

2. The method of claim 1 wherein controlling the volume comprises controlling a pump to cause the recirculated portion of the overflow stream to deliver at least a minimum flow to the overflow system.

3. The method of claim 1 wherein controlling the volume comprises controlling a pump to cause the recirculated portion of the overflow stream to deliver at least a minimum flow to the settler vessel.

4. The method of claim 1 in which the step of recirculating a portion of the overflow stream comprises returning at least a minimum flow to a feed system of the settler vessel by pumping.

5. The method of claim 4 in which the portion of the overflow stream is mixed with a feed from the feed system.

6. The method of claim 1 in which the overflow system comprises a launder.

7. The method of claim 6 in which the step of recirculating a portion of the overflow stream comprises introducing the portion of the overflow stream at at least one injection point in the launder.

8. The method of claim 7 comprising introducing the portion of the overflow stream into the launder at a plurality of injection points about a perimeter of the launder.

9. The method of claim 1 in which the overflow stream is separated into at least two immiscible phases and the recirculated portion of the overflow stream comprises at least one of the at least two immiscible phases.

10. The method of any one of claim 1 wherein controlling the volume comprises controlling the volume of the recirculated portion of the overflow stream to maintain a stream flow sufficient for scouring the overflow system and suspending any solids.

11. The method of any one of claim 1 wherein controlling the volume comprises controlling the volume of the recirculated portion of the overflow stream to maintain a stream flow sufficient to control fouling by establishing a high shear, turbulent flow in the overflow system.

12. The method of any one of claim 1 in which the overflow stream includes asphaltenes and wherein controlling the volume comprises controlling the volume of the recirculated portion of the overflow stream to maintain a stream flow that acts to control fouling by establishing a high shear, turbulent flow that prevents deposition of asphaltene solids and suspends solids that precipitate in the stream flow.

13. A system for controlling fouling of a settler vessel overflow system, the overflow system being operable to produce an overflow stream, the system comprising:
   means for recirculating a portion of the overflow stream back through the overflow system; and
   means for controlling a volume of the recirculated portion of the overflow stream to maintain at least a minimum stream flow in the overflow system, the minimum stream flow being adequate to reduce fouling of the overflow system.

14. The system of claim 13 wherein the means for controlling comprises means for pumping and means for adjusting the volume of the portion of the overflow stream that is recirculated.

15. The system of claim 13 in which the means for controlling is configured to transfer at least a minimum flow to the overflow system.

16. The system of claim 13 in which the means for controlling is configured to transfer at least a minimum flow to the settler vessel.

17. The system of claim 13 in which the means for controlling is configured to transfer at least a minimum flow to a feed system of the settler vessel.

18. The system of claim 17 further comprising means for mixing the recirculated portion of the overflow stream with a feed from the feed system.

19. The system of claim 13 in which the overflow system comprises a launder.

20. The system of claim 19 in which the means for recirculating comprises a piping system having at least one inlet in the launder.

21. The system of claim 20 in which the at least one inlet comprises a plurality of inlets about a perimeter of the launder.

22. The system of any one of claim 13 including means for separating the overflow stream into at least two immiscible phases whereby the portion of the recirculated overflow stream comprises at least one of the at least two immiscible phases.

* * * * *